United States Patent [19]
Allard et al.

[11] 3,772,693

[45] Nov. 13, 1973

[54] SECONDARY RADAR RANGING SYSTEMS

[75] Inventors: Robert Allard, Malvern; Peter Joseph Bulman, Crowle; John Lawton Clarke, Malvern; John Roger Prior, Malvern; Donald Frederick Sampson, Malvern, all of England

[73] Assignee: Esso Research and Engineering Company, Linden, N.J.

[22] Filed: Nov. 17, 1970

[21] Appl. No.: 90,393

[30] Foreign Application Priority Data
Nov. 19, 1969 Great Britain.................. 56,556/69

[52] U.S. Cl.............. 343/6.5 LC, 343/9, 343/13 R
[51] Int. Cl................................................ G01s 9/56
[58] Field of Search.................. 343/6.5 R, 6.5 LC, 343/13 R, 9

[56] References Cited
UNITED STATES PATENTS

| 3,690,767 | 9/1972 | Missio et al......................... 343/9 X |
| 3,707,717 | 12/1972 | Frielinghaus........................ 343/9 X |
| 3,530,470 | 9/1970 | Sheftelman et al............ 343/6.5 LC |
| 3,564,543 | 2/1971 | Nehama et al................... 343/6.5 R |

Primary Examiner—T. H. Tubbesing
Attorney—Hall, Pollock & Vande Sande

[57] ABSTRACT

A system for assisting the berthing of large ships measures their range and aspect relative to the berth and includes two master radars on the ship and two radar transponders at the berth and means for measuring the four ranges between each master radar and each transponder. Alternatively the master radars may be at the berth and the radar transponders on the ship.

9 Claims, 6 Drawing Figures

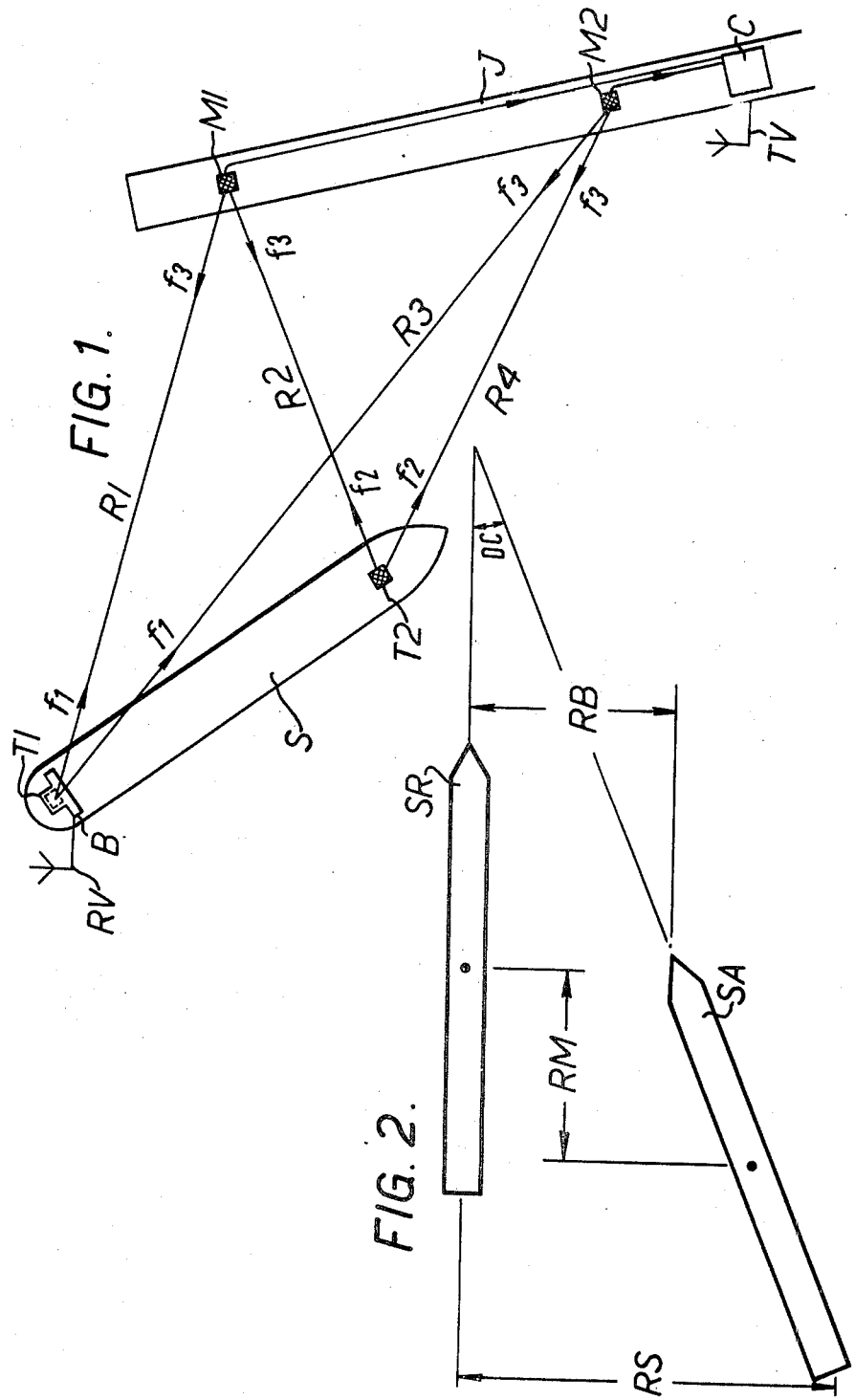

SECONDARY RADAR RANGING SYSTEMS

The present invention relates to apparatus and methods for assisting the berthing of ships using radar.

The difficulties of berthing large ships such as supertankers have been acknowledged for some time and several techniques have been considered for supplementing the traditional methods for gauging the ship's position and speed.

In order to pilot the largest vessels to their berths, a sensor system is needed which will measure the position and aspect of a ship at all times while she is within 1000 ft. (300 metres) of the jetty with an accuracy of ±4 ft (±1.2 metres). The system must present the ranges, velocities and accelerations of the ship in a readily readable form to the pilot and it is operationally highly desirable that the measurements be made and processed automatically without employing moving parts or human assistance.

It is an object of the invention to apply secondary radar techniques to the problem of berthing large ships.

According to the present invention there is provided apparatus including a first master radar and a second master radar adapted for use on a first object in co-operation with a first radar transponder and a second radar transponder on a second object between which and the first object relative motion is possible, the apparatus being adapted for measuring the relative distance and aspect between the first object and the second object by the measurement of (a) the range between the first master radar and the first radar transponder, (b) the range between the first master radar and the second radar transponder (c) the range between the second master radar and the first radar transponder and (d) the range between the second master radar and second radar transponder.

According to an aspect of the invention there is provided apparatus including a first radar transponder and a second radar transponder adapted for use on a first object in co-operation with a first master radar and a second master radar on a second object between which and the first object relative motion is possible, the apparatus being adapted for measuring the relative distance and the aspect between the first object and the second object by the measurement of (a) the range between the first master radar and the first radar transponder (b) the range between the first master radar and the second radar transponder, (c) the range between the second master radar and the first radar transponder and (d) the range between the second master radar and the second radar transponder.

The first and second objects may be a ship and a jetty. Alternatively, they may be a cargo ship and a lighter. The ship may carry a display indicating to the master the relative distance and aspect of his ship and the jetty.

Preferably the master radars include pulse radar ranging systems as disclosed in the specification of Allard et al copending U.S. patent application Ser. No. 90,394 filed Nov. 17, 1970, for Pulse Radar Ranging now U.S. Pat. No. 3,721,981, issued Mar. 20, 1973 in which there is provided a pulse radar ranging system including means for generating a sequence of pulses regular in time, means for generating a set of first pulses each so timed relative to a radar transmitter pulse that there is a fixed interval between it and the radar transmitter pulse and whose timing is random compared with the sequence of pulses, means for generating a set of second pulses each contemporaneous with a radar received pulse, whereby an interpulse period of a first kind is defined as that period which starts with a first pulse and ends with the next occurring second pulse and an interpulse period of a second kind is defined as that period which starts with a second pulse and ends with the next occurring first pulse, counting means, means for allowing the sequence of pulses to be applied to the counting means for the duration of a plurality of interpulse periods of the same kind as each other, and means for extracting from the counting means the count registered in the counting means divided by the number of interpulse periods for the duration of which the sequence of pulses was applied to the counting means.

Alternatively, the master radars may include pulse radar ranging systems as disclosed in the specification of United Kingdom Pat. No. 1,290,917, in which there is provided a pulse radar ranging system including a pulse radar transmitter, means for generating a timing waveform, means for controlling the pulse radar transmitter to emit a pulse at a time controlled with reference to the timing waveform, means for generating a set of first pulses each so timed relative to a radar transmitter pulse that there is a fixed interval between it and the radar transmitted pulse, means for generating a set of second pulses each contemporaneous with a radar received pulse, whereby an interpulse period of a first kind is defined as that period which starts with a first pulse and ends with the next occurring second pulse and an interpulse period of a second kind is defined as that period which starts with a second pulse and ends with the next occurring first pulse, counting means, means for generating a plurality of sequences of pulses having the same frequency as each other but having different phases from each other the said different phases being equally spaced between 0 and 2 $\pi$ radians and the said plurality of sequences of pulses being accurately timed with reference to the timing waveform and means for allowing the said sequences of pulses to be applied to the counting means for the duration of a plurality of interpulse periods of the same kind as each other, and means for extracting from the counting means the count registered in the counting means divided by the number of interpulse periods for the duration which the sequence of pulses was applied to the counting means.

An embodiment of the invention will be described by way of example with reference to the accompanying drawings, in which:

FIG. 1 is a plan view of a ship berthing system in which the jetty carries master radars and the ship carries transponders;

FIG. 2 is a diagram in plan showing distances and angles which may be calculated from the radar data given by the system described with reference to FIG. 1;

Figure 3:
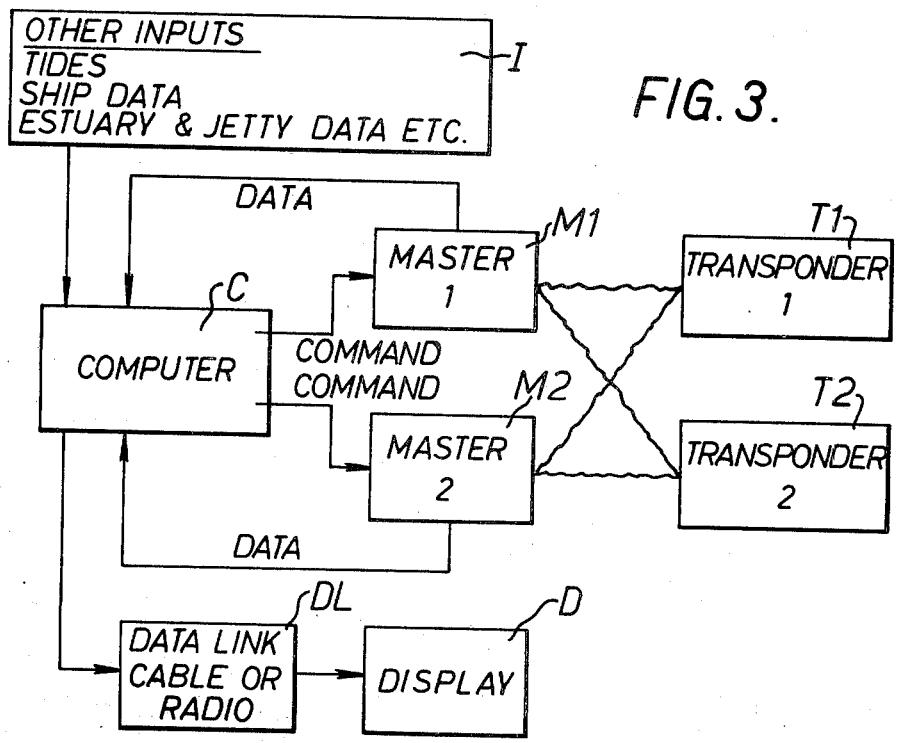
FIG. 3 is a block diagram of the berthing system.

The sensor system defines uniquely the position of the vessel at frequent intervals during the berthing operation. Successive measurements of position enable velocity and acceleration in all three degrees of freedom to be calculated, and the processed information is presented on a special display panel on the bridge.

FIG. 1 is a plan view of a ship berthing system in which a jetty J carries two master radars M1 and M2 and a ship S carries two transponders T1 and T2. The master radars M1 and M2 are placed in known positions on the jetty J and connected to a computer C; and two transponders T1 and T2 are mounted in known positions on the ship S. There is considerable freedom in positioning the master radars M1 and M2 and the transponders T1 and T2; all that matters is that the positions when chosen are fed into the computer C.

The position of the ship is determined by measuring four ranges R1, R2, R3 and R4. The ranges R1 and R2 are defined as the ranges of the transponders T1 and T2 respectively from the master radar M1. The ranges R3 and R4 are defined as the ranges of the transponders T1 and T2 respectively from the master radar M2.

The master radars M1 and M2 have a common transmitter frequency $f_3$, to which both of the transponders T1 and T2 are tuned. The transponder T1 replies on a frequency $f_1$ and the transponder T2 replies on a different frequency $f_2$.

The action of the arrangement is as follows. The computer C is programmed to control the sequence of measurement and this it does by calling in turn for the ranges R1, R2, R3 and R4. For example, when it calls for the range R1 it activates the master radar M1 and controls it to be receptive to the frequency $f_1$ in a manner described below with reference to FIG. 5. The master radar M1 then starts to transmit pulses which are received by both transponders T1 and T2, which reply on the frequencies $f_1$ and $f_2$ respectively. However, since at this time the master radar M1 is only receptive to the frequency $f_1$ it is the range R1 that is calculated. The ranges R2, R3 and R4 are calculated inn similar ways.

Thus the four ranges R1, R2, R3 and R4 are passed to the computer C which also calculates the trigonometry required to present the ship's actual position SA relative to its required position SR in the form depicted in FIG. 2. The bow and stern ranges RB and RS respectively are calculated together with their velocities and accelerations, as is the fore-and-aft alignment RM and its velocity, and in addition the angle $\theta$ which the center line of the ship S makes with the jetty and its rate of change.

Apart from these calculations the computer C smooths the data and checks for errors. This it does in two ways: gross changes in range are impossible in short times, so present data can be checked for plausibility against previous data; furthermore, if four range measurements are obtained a self consistency check can be made and used to reject erroneous measurements.

FIG. 1 shows the master radars M1 and M2 and the computer C mounted on the jetty J so that a radio data link must be used to operate the display panel on the bridge B. For this purpose the computer C has a VHF transmitter TV and the bridge B has a VHF receiver RV. The arrangement of master radars and transponders is quite symmetrical, however, and the master radars M1 and M2 and the computer C may advantageously be mounted on the ship S with the transponders T1 and T2 mounted on the jetty J. When the master radars M1 and M2 and the computer C are mounted on the ship S only a cable is needed to link the computer C to the display on the bridge B. It may be necessary in some cases to have more than two radars or more than two transponders or both, on ship or shore, because of masking effects or for other reasons.

FIG. 3 is a block diagram of the berthing system. The system is controlled by the computer C, which instructs one of the master radars M1 to measure one of its ranges, say R1. When this is ready the range R2 is called for, and then the computer commands the master radar M2 to measure R3 and R4 in sequence. The four ranges are measured in about 1 second. The calculations are made and the processed information passed to the display D via a data link DL, which may be cable or radio or another form. The sequence is repeated approximately every ten seconds. The computer is also fed with the transponder and master positions and tidal height via an input I since the geometry is three dimensional.

The advantage of a radar-plus-transponder system is that at any one time a master radar is responsive to the desired transponder only. Since one transponder reply is on a frequency distinct from that of the other transponder and from that of the master itself, there is no confusion between transponders, nor are normal radar echoes detected. In this way wide angle (even omnidirectional) aerials can be used, there is no need for moving parts and a cheap and simple system can be realised.

Figure 4:
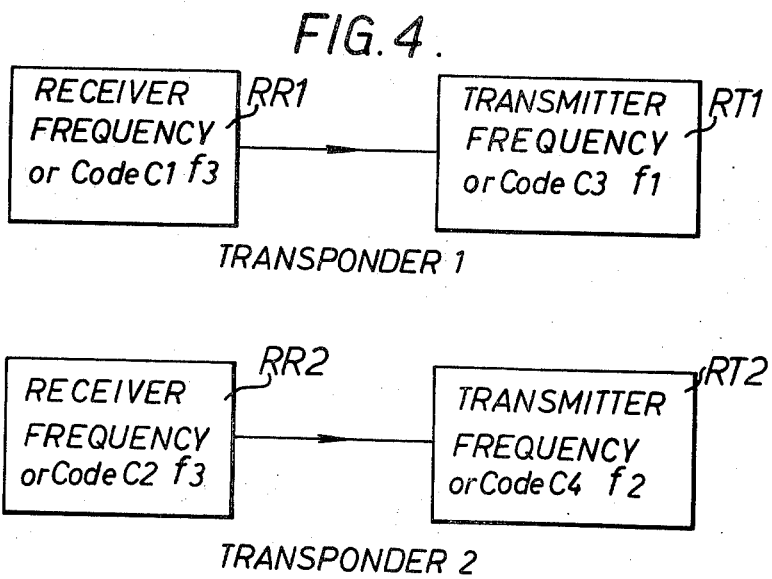
FIG. 4 is a block diagram of the transponders.

FIG. 4 is a block diagram of the transponders which are very simple. The transponder T1 consists of a radar receiver RR1 tuned to the frequency $f_3$ and coupled to a radar transmitter RT1 tuned to the frequency $f_1$. The transponder T2 consists of a radar receiver RR2 tuned to the frequency $f_3$ and coupled to a radar transmitter RT2 tuned to the frequency $f_2$. A transmission from either master radar causes both transponders T1 and T2 to reply, each on its own frequency $f_1$ and $f_2$ respectively.

Figure 5:
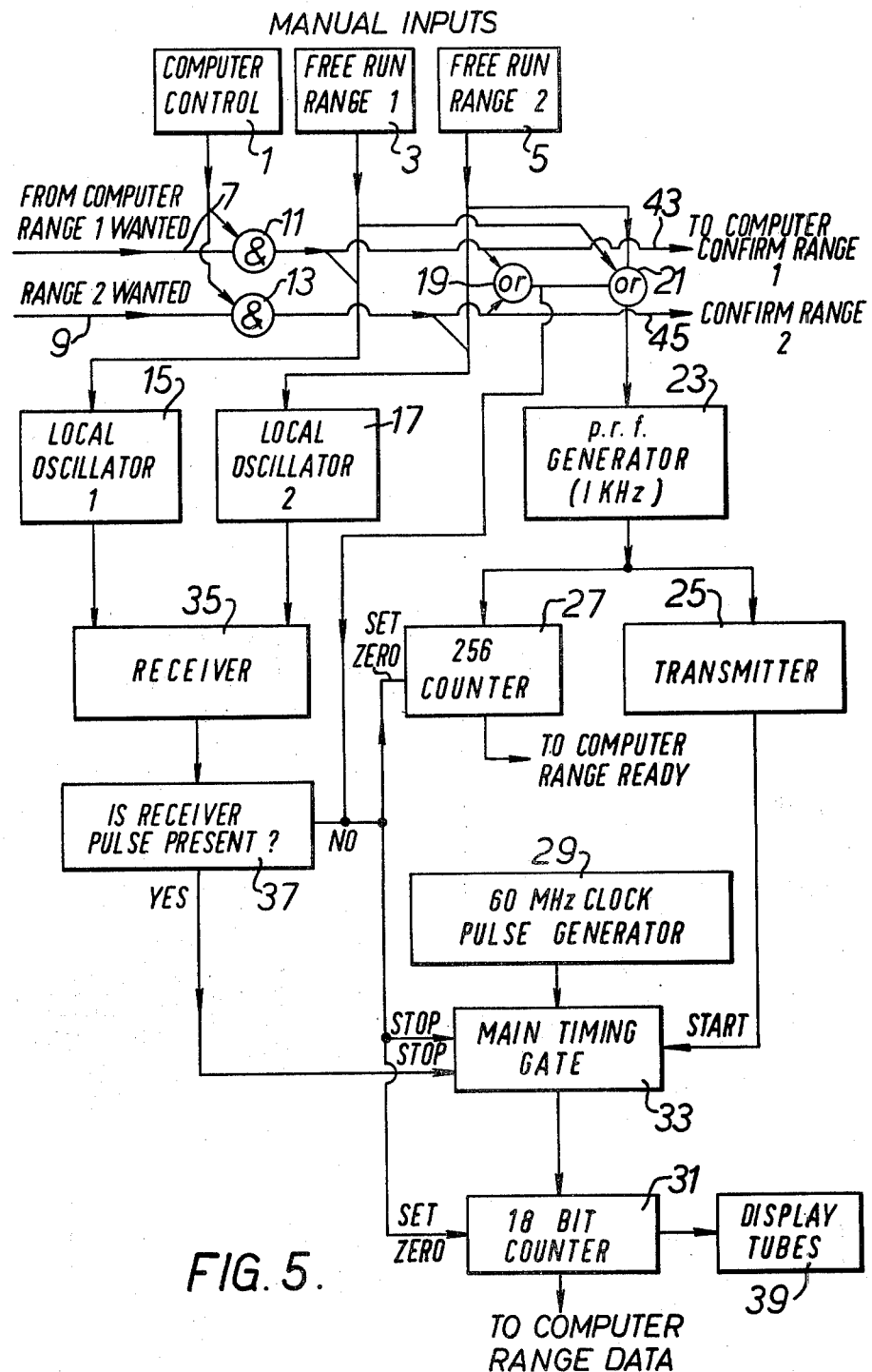
FIG. 5 is a block diagram of a master radar.

FIG. 5 is a block diagram of the master radars, each of which consists of a transmitter, a receiver, and logic circuits which measure the time interval between transmission and reception and send the answer via the data cable to the computer.

The master radar can be controlled either manually or via the computer C described above with reference to FIG. 3. A first manual input 1 hands over control to the computer. A second manual input 3 causes the master radar to measure the range to the transponder T1 continuously. A third manual input 5 causes the master radar to measure the range to the second transponder T2 continuously. An input 7 from the computer C is used to indicate that the radar is required to measure the range to the transponder T1. An input 9 from the computer C is used to indicate that the radar is required to measure the range to the transponder T2. The input 7 is applied to an AND-gate 11 which is controlled to be opened by the manual input 1 when the manual input 1 is operational. The input 9 is applied to an AND-gate 13 which is controlled to be opened by the manual input 1 when the manual input 1 is operational. Both the output of the AND-gate 11 and the output of the manual input 3 are applied to a first local oscillator 15. Both the output of the AND-gate 13 and the output of the manual input 5 are applied to switch on a second local oscillator 17. Both the output of the AND-gate 11 and the AND-gate 13 are applied to an OR-gate 19, the output of which is applied, together with the outputs of the manual inputs 3 and 5 to a second OR-gate 21. The output of the OR-gate 21 is applied to switch on a 1 KHz pulse recurrence frequency generator 23, which is connected both to energise the radar transmitter 25 and to set a 256 state (i.e. 8 stage) counter 27 running.

A 60 MHZ clock pulse generator 29 is applied to an 18 bit counter 31 via a main timing gate 33, which is in fact a bi-stable circuit and is opened by the transmitter 25.

The main timing gate 33 is connected to be closed in the following manner. Whichever local oscillator, 15 or 17, is switched on is connected in the circuit of the radar receiver 35. A logic circuit 37 is used to detect the presence or otherwise of a receiver pulse. When a receiver pulse is present the circuit 37 is used to close the main timing gate 33. On the other hand, when no pulse is received, the whole system is reset after a time corresponding to a range greater than the maximum expected by a connection from the logic circuit 37 stopping the main timing gate 33 and setting the counter 27 and the counter 31 to zero. A second output from the OR-gate 19 is connected to perform the same function at the beginning of each range measurement cycle.

A set of display tubes 39 on the master radar is used to indicate the range measured, particularly for manual input purposes. For automatic transfer of radar to the computer three outputs are used. Confirmation of which range is being measured is applied via outputs 43 and 45, fed from the gates 11 and 13 respectively. The output of the counter 27 is applied to the computer to indicate that a range has been measured. The actual value of the range measured is the value indicated on the counter 31 and this too is applied to the computer.

The action is as follows. The master radar is normally run with the manual input 1 operative so that it is controlled by the computer C. When the computer C calls for a range to be measured the appropriate local oscillator 15 or 17 is switched on so that the receiver 35 is sensitive to the desired transponder T1 or T2 respectively. The transmitter 25 is fired and the main timing gate 33 is opened so that the fast clock pulses from the clock pulse generator 29 may pass through to the 18 bit counter 31. The gate 33 is closed by the receiver pulse so that the number of pulses recorded in the counter 31 is proportional to range. The range is measured 256 times at intervals of one millisecond and then the 256 counter 27 stops the transmitter 25 and informs the computer C that the range is ready. When the computer C has digested the range it sends a signal which resets both counters 27 and 31 and switches off the local oscillator 15 or 17. The master radar is then ready to measure another range when required.

The 60 MHz clock pulse counting system will measure range with a basic stepping error of 8 feet (2.4 metres) for a single measurement. By measuring the range 256 times, however, and taking the averaged result, the stepping error is reduced by $\sqrt{256}$, or 16 times, to 0.5 ft. (150 mm). This follows from the fact that the clock pulse generator 29 runs randomly from the pulse recurrence frequency generator 23.

When the transponder selected is out of range of the radar, so that no return pulse is received, the system is reset after a time corresponding to a very long range by the logic circuit 37.

The transmitters in the master radars and transponders are identical (except that they are preset to different frequencies) and the same is true of the receivers except that the master radars have two local oscillators. Production therefore involves assembling standard building blocks, and presetting them to their appropriate frequencies.

The purpose of the manual inputs 3 and 5 is to allow a master radar and transponder pair to be used independently of the computer to measure a single range. The appropriate local oscillator 15 or 17 respectively is switched on and the display tubes 39 are controlled to display the range measured at the end of every 256 counts of the counter 27.

The system described above with reference to FIG. 5 provides a method of interpolation between range increments by running a fast clock pulse generator randomly with respect to the pulse recurrence frequency. An alternative method of interpolation relies on systematic sampling of range counts and is described below with reference to FIG. 6.

Figure 6:
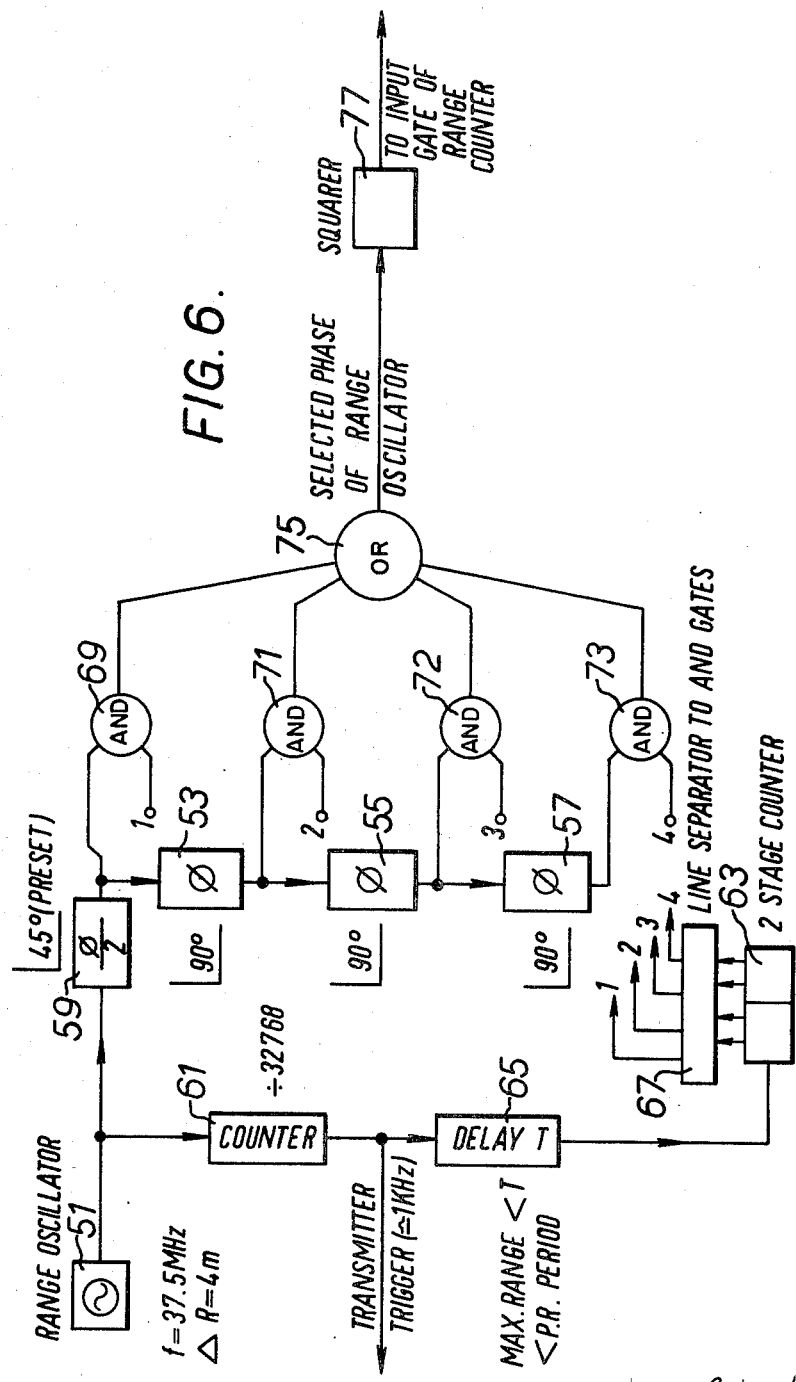
FIG. 6 is a block diagram of part of an alternative master radar.

FIG. 6 is a block diagram of part of an alternative master radar. A range oscillator 51 has a frequency of 37.5MHz and its output is fed to a chain of three 90° phase shifters 53, 55, 57 successively via a preset phase shifter 59 which introduces a phase change of about 45°.

The output of the range oscillator 51 is also applied to a counter 61 which divides the frequency by $2^{15}$, i.e. 32,768. The output of the counter 61 is an approximately 1KHz pulse signal, and is applied to trigger the transmitter (not shown in FIG. 6). The output of the counter 61 is also applied to a two stage counter 63 via a delay 65 which delays the signal by a time T. The output of the two stage counter is applied to a line separator 67 which has four outputs which become energised in turn by successive output pulses from the counter 61. These four outputs are applied to four separate AND-gates, 69, 71, 72 and 73. The outputs of the phase shifters 59, 53, 55 and 57 are applied respectively to the separate AND-gates 69, 71, 72 and 73. The outputs of the four AND-gates 69, 71, 72 and 73 are applied as inputs to a single OR-gate 75 whose output is applied to the input gate of a range counter such as the counter 31 in FIG. 5 via a pulse squaring circuit 77.

The action of the circuit is as follows. By means of the chain of phase shifters 59, 53, 55, 57, four versions of the output of the range oscillator 51 are presented to the four gates 69, 71, 72, 73 respectively. These four versions will differ from each other in phase, and will be phase shifted by 45°, 135°, 225°, and 315° respectively from the output of the range oscillator 51. These four versions are applied in turn (by a method described below) to the pulse squarer 77 via the OR-gate 75. The squared output from the pulse squarer 77 is presented to the input gates of a range counter similar to the range counter 31 in FIG. 5.

By this means radar ranges are measured in turn by counting with the four different versions of the output of the range oscillator 51. The sum of the four range measurements will therefore compensate in part for the error caused by the finite time between successive periods of the range oscillator 51. In other words, a quarter of the sum of the four range measurements will give the radar range to an accuracy 4 times that of the individual range measurements, i.e. ± ⅛ of a range quantum.

In this arrangement the transmitter is controlled to emit a transmitter pulse at a time accurately controlled with reference to the range oscillator 51, namely, every 32,768 periods of the range oscillator 51. Clearly the best time to change from one counting phase to the next is immediately after a period corresponding to the maximum range expected. This is arranged by the delay 65, which has a delay in time T greater than the maximum range expected but less than the transmitter pulse recurrence period. Alternatively, a suitably timed signal can be derived from the counter 61. By this means a pulse reaches the two stage counter 63 before a transmitter trigger pulse is applied to the transmitter to control it to emit a new transmitter pulse. Thus the four outputs from the line separator 67 are rendered operative at successive times and change over before the transmitter emits a transmitter pulse.

For ease of comprehension, in the system described above with reference to FIG. 6, four versions of the range oscillator 51 are used for interpolation. In practice it would be preferable to use a larger number, for example 8.

If averaging must be carried out by special purpose equipment on a continuously tracked target, as in ship berthing, then a missing reply will upset the count by allowing the counter 31 in FIG. 5 to run on past the time when it ought to have stopped. One method of avoiding such a happening is to start the counter 31 with the received signal and stop it with a pulse corresponding to maximum range derived from the ranging oscillator by the transmitted radar pulse. The counter 31 is reset to m times maximum range at the end of every batch of m range samples, and the oscillator 23 (FIG. 5) or 51 (FIG. 6) is used to subtract ONE from the accumulated total for every Δ R period.

In the pulse radar ranging system described above the master radars are controlled to transmit pulses to both transponders but receive pulses from a selected one of the two transponders. An alternative system, which might in some ways be better, would work by selective addressing of the wanted transponder by transmitter pulse coding. For example, a master radar may be arranged to have an output consisting of two pulses, and the time difference between the two pulses would be different in the case of the two transponders. The individual transponders would be controlled to respond only to a pair of pulses having the correct timing between them. Not only would this allow for distinguishing between the interrogating signals but it would provide a certain anti-interference facility, preventing transponders from being triggered by interfering signals. For the same reason it may be desirable to encode the transponder replies.

What is claimed is:

1. Apparatus for assisting the berthing of a ship comprising a first master radar and a second master radar fixedly spaced from one another at known positions on a first object, a first radar transponder and a second radar transponder fixedly spaced from one another at known positions on a second object, one of said objects constituting a jetty and the other of said objects constituting a ship to be berthed at said jetty and movable relative thereto, said apparatus further including means for repeatedly and consecutively measuring each of the four ranges between the two master radars and the two transponders, and means responsive to said four measured ranges for determining the ranges of the bow and stern of the ship from the jetty, for determining the fore and aft alignment of the ship relative to its desired berthing position, and for determining the velocities and accelerations of the bow and stern of the ship and the fore and aft velocity of the ship.

2. Apparatus as claimed in claim 1 and in which both the first master radar and the second master radar include means for generating a sequence of pulses regular in time, means for generating a set of first pulses each so timed relative to a radar transmitter pulse that there is a fixed interval between it and the radar transmitted pulse and whose timing is random compared with the sequence of pulses, means for generating a set of second pulses each contemporaneous with a radar received pulse, whereby an interpulse period of a first kind is defined as that period which starts with a first pulse and ends with the next occurring second pulse and an interpulse period of a second kind is defined as that period which starts with a second pulse and ends with the next occurring first pulse, counting means, means for allowing the sequence of pulses to be applied to the counting means for the duration of a plurality of interpulse periods of the same kind as each other, and means for extracting from the counting means the count registered in the counting means divided by the number of interpulse periods for the duration of which the sequence of pulses was applied to the counting means.

3. Apparatus as claimed in claim 1 and in which both the first master radar and the second master radar include means for receiving radar returns from the first radar transponder to the exclusion of the second radar transponder and means for receiving radar returns from the second radar transponder to the exclusion of the first radar transponder.

4. Apparatus as claimed in claim 3 and in which the first radar transponder is arranged to respond on a different frequency from the second radar transponder and the means for receiving radar returns from the first radar transponder to the exclusion of the second radar transponder includes a local oscillator of such a frequency that the master radar is receptive to the first radar transponder to the exclusion of the second radar transponder and the means for receiving radar returns from the second radar transponder to the exclusion of the first radar transponder includes a local oscillator of such a frequency that the master radar is receptive to the second radar transponder to the exclusion of the first radar transponder.

5. Apparatus as claimed in claim 3 and in which the first radar transponder is arranged to respond to coded interrogating radar signals having a first code and the second radar transponder is arranged to respond to coded interrogating radar signals having a second code and the means for receiving radar returns from the first radar transponder to the exclusion of the second radar transponder includes means for controlling the interrogating master radar to transmit a coded radar signal having the first code and the means for receiving radar returns from the second radar transponder to the exclusion of the first radar transponder includes means for controlling the interrogating master radar to transmit a coded radar signal having the second code.

6. The apparatus of claim 1 wherein the ship is fitted with a radio receiver adapted for use in cooperation with a radio transmitter on the jetty for the reception of the range data at the ship.

7. The apparatus of claim 1 wherein the ship is fitted with a display indicating the range and aspect of the ship with reference to the jetty.

8. A method of berthing ships comprising measuring the distances between a first master radar and each of two radar transponders and between a second master radar and each of the said two radar transponders, the said first and second master radars being situated at known fixedly spaced positions on the ship to be berthed and the said two radar transponders being situated at known spaced fixed positions relative to the desired berthing position.

9. A method of berthing ships comprising measuring the distances between a first master radar and each of two radar transponders and between a second master radar and each of the said two radar transponders, the said first and second master radars being situated at known spaced fixed positions relative to the desired berthing position and the said two radar transponders being situated at known fixedly spaced positions on the ship to be berthed.

* * * * *